Oct. 24, 1950   J. L. THORPE   2,526,782
AIR CLEANER AND DEODORIZER
Filed May 8, 1948                                    2 Sheets-Sheet 1
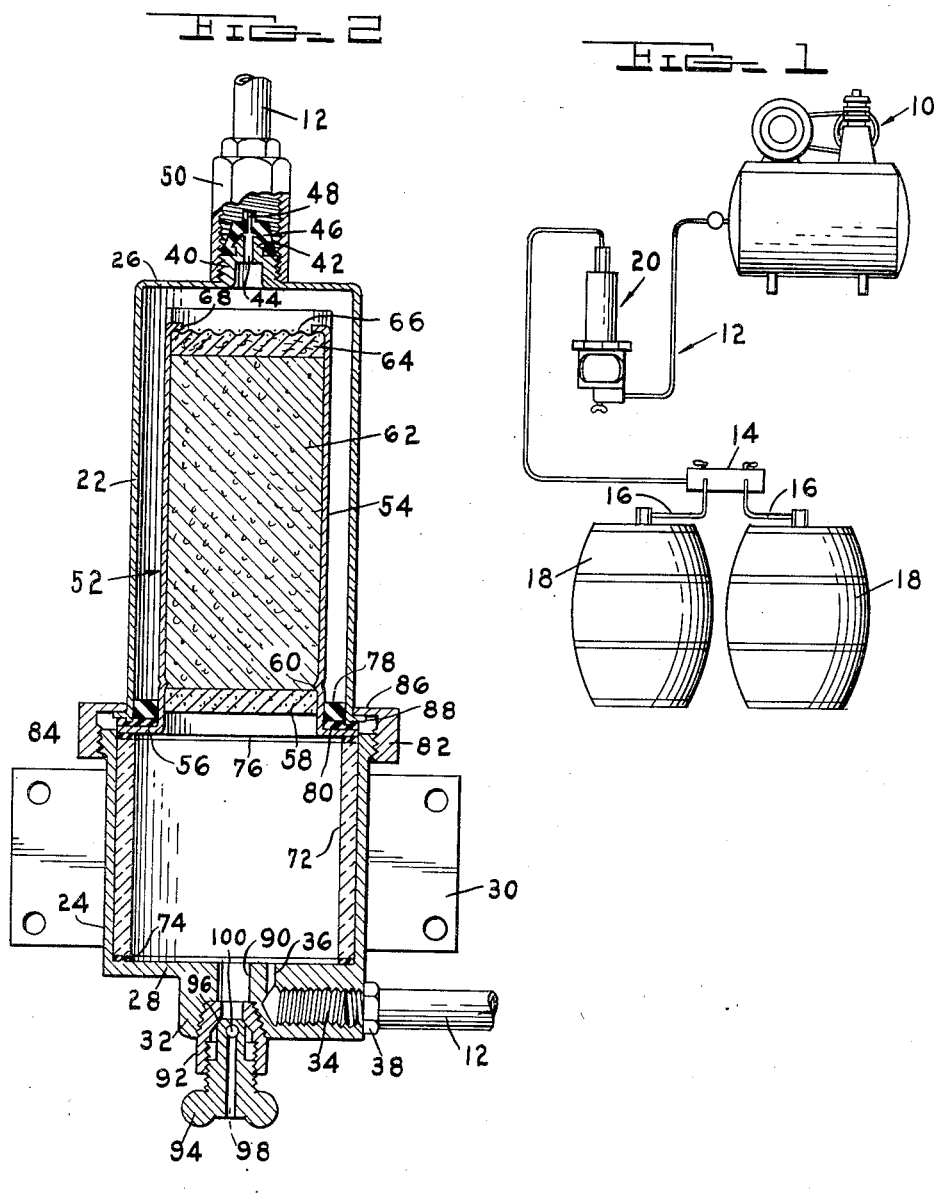
INVENTOR.
JAY L. THORPE
BY
Burton & Parker.
ATTORNEYS

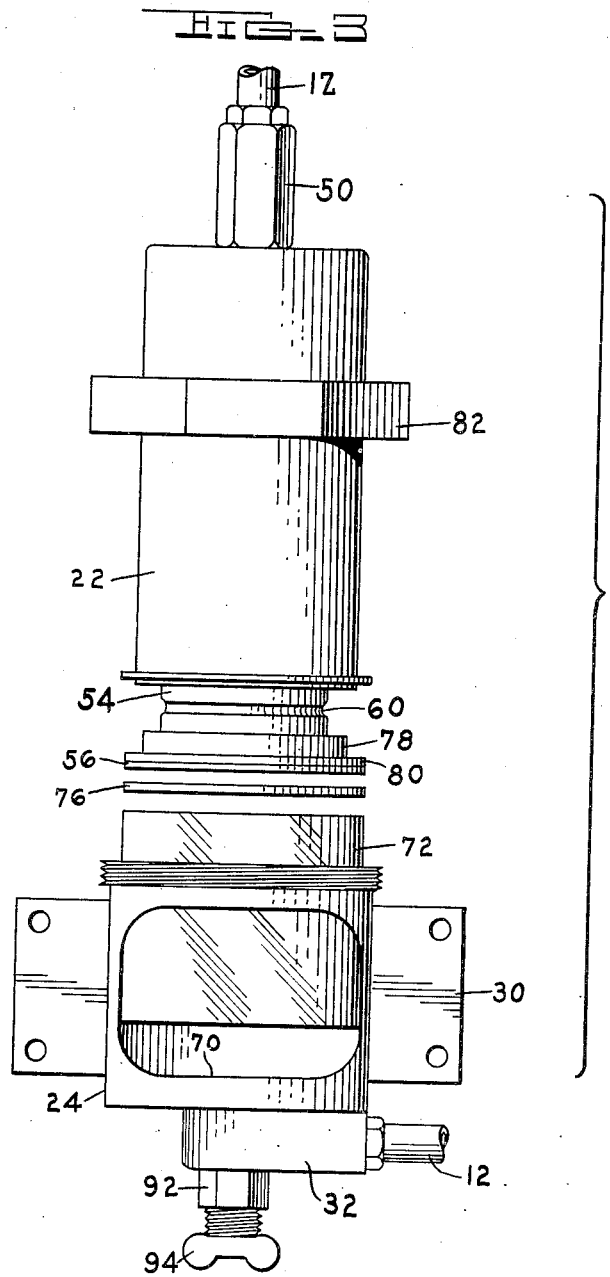

UNITED STATES PATENT OFFICE 2,526,782

AIR CLEANER AND DEODORIZER

Jay Lee Thorpe, Detroit, Mich.

Application May 8, 1948, Serial No. 25,811

5 Claims. (Cl. 183—45)

This invention relates to air cleaning, filtering and deodorizing devices and particularly to a unit of this character for installation in air delivery lines.

In the past, air cleaning and filtering devices have been used in air pressure lines particularly of beer dispensing equipment to clean the air and remove all moisture therefrom before the air reaches the beer kegs or other containers from which the beer is dispensed. Such devices in the past have been satisfactory to a certain extent but after the filter deteriorated in use and the transparent portions became fogged with moisture and foreign matter it was difficult to quickly and conveniently remove these parts for cleaning and replacement. In other fields, such as medical and dental, there is a need for a convenient attachable and detachable air filtering and deodorizing unit for cleaning the air used either directly on patients or with professional equipment. In the field of commercial art and like endeavors paint has been sprayed by carbon dioxide under pressure in lieu of air because of the moisture carrying capacity of the latter. In such uses, a convenient installable and maintainable air cleaning unit for providing dry filtered air would reduce the cost of spraying paint and like materials.

An important object of this invention is to provide an air filtering and cleaning unit which is easily and conveniently installed in air pressure lines and which is readily maintainable in efficient operating condition throughout its use. Another important object of the invention is to provide an inexpensive unit of this character which is composed of parts capable of manufacture and assembly at low cost. A further important object of the invention is to provide a novel air filtering and cleaning unit which functions in a highly efficient manner to remove all moisture from air passing therethrough under high velocity and which is composed of separable sections for quickly gaining access to the interior parts for replacement, cleaning or any other maintenance operations.

Various other objects, advantages and meritorious features will become more fully apparent from the following specification, appended claims and accompanying drawings wherein:

Fig. 1 is a schematic view illustrating the installation of the air filtering and cleaning unit of this invention in the air line of beer dispensing equipment, Fig. 2 is a vertical sectional view through the air filter and cleaning unit of this invention, and Fig. 3 is an exploded view of the unit of Fig. 2 showing the parts arranged in order of their assembly.

The air cleaning and filtering device of this invention is embodied in a conveniently installable unit for use in any air pressure line where it is desired to clean, filter and deodorize the air discharged therefrom. The illustrated embodiment of the invention is shown in Fig. 1 as installed in the air line of a beer dispensing apparatus but it is understood that the invention may be incorporated in the air line of any other equipment.

Referring to Fig. 1, there is shown an air compressor generally indicated at 10 connected by an air line or conduit 12 to a two-way air valve distributor 14 having branch lines 16—16 leading to two beer kegs 18—18. The air cleaning and deodorizing unit of the present invention is generally indicated at 20 and is shown as installed in the air pressure line 12 between the pump and the two-way distributor.

An important feature of the invention is the provision of a housing or casing for the filtering and cleaning elements of the device which is readily divisible into two parts for gaining access to the interior for cleaning, replacing and otherwise maintaining the elements in satisfactory working condition. One disadvantage of devices of this character in the past has been the difficulty of gaining access to all the operating parts therein and usually because of this difficulty the purchaser or user of the device failed to maintain the equipment in the best operating condition possible. In the present invention, the separation of the casing into two parts renders all the operating elements quickly available for cleaning and replacement.

Referring to Figs. 2 and 3, the unit 20 comprises an outer casing or shell of metal or other suitable material divided longitudinally into two parts or shell sections. One such part of the casing is indicated at 22 and in the vertical position of the unit in the drawings assumes the upper portion of the casing. The other or lower part is indicated at 24. These two parts are preferably cylindrical in cross section and each is opened at one end and closed at the other end. The closed end wall of the upper part is indicated at 26; that for the lower part being indicated at 28. The two parts of the casing are arranged in axial alignment with the open ends substantially abutting one another and by the provision of additional means hereinafter described are detachably secured together in an air-tight manner to provide a closed chamber extending from one end wall to the other end wall. One part of the casing, such as the lower part 24 may be provided with an apertured plate 30 for mounting the unit on any suitable support.

Air under pressure is admitted into one end of the casing and after flowing therethrough is discharged from the other end. For this purpose, the end wall 28 of the lower part is thickened to provide a depending projection or boss 32. An internally threaded bore or passage 34 enters the inside of the boss and communicates with the interior of the part 24 by means of a port 36. The air supply side of the air line 12 may be fitted into the passage 34 to deliver air under pressure thereto. The fitted end of the air line may be externally threaded as shown in Fig. 2 for threaded engagement in the passage and a nut 38 threaded on the connected end of the line secures the same in air tight manner to the boss 32.

The end wall 26 of the upper part 22 is provided with an externally threaded upwardly projecting nipple 40 having a reduced conically shaped head 42 on the upper end thereof. An axial bore 44 in the head and nipple provides communication with the interior of the part 22 of the casing for the discharge of air therefrom. Secured to the head 42 in yielding gripping engagement therewith is a resilient member 46 of conventional design having a slitted opening 48 aligning with the bore 44. This resilient member may be formed of rubber or other like material and serves as a check valve preventing return flow of air to the casing. Surrounding the nipple and associated parts and forming a protective housing therefor is an internally threaded sleeve 50 threadedly secured to the nipple in the manner shown in Fig. 2. The sleeve projects above the check valve 46 and is secured to the discharge side of the air pressure line 12.

Carried within the upper part 22 of the casing is a removable and replaceable cartridge generally indicated at 52 having agents therein for cleaning, filtering and deodorizing the air passing therethrough. The cartridge 52 comprises a cylindrical shell 54 opened at its opposite ends and provided at its lower end as shown in Fig. 2 with an outwardly extending circular flange 56 having an outer diameter at least equal to the diameter of the part 22. Extending across the mouth of the shell 54 is a porous bronze disc 58 through which the air introduced into the casing must travel. The inner marginal edge of the disc is seated against an inner peripheral ridge 60 formed in the shell 54 by crimping the shell 54 inwardly circularly therearound. Above the porous disc are activated carbon granules 62 which occupy substantially the major portion of the length of the shell 54. Above the carbon granules is a layer of glass fibres 64 over the top of which is laid a metal screen 66 of copper or the like. At circularly spaced points around the upper end of the shell tangs 68 are cut and bent inwardly to overlie the screen 66 and to compressively hold the agents in the shell. It is to be noted that the cartridge 52 is endwise receivable through the opened end of the casing part 22.

The lower part 24 of the casing is provided with an aperture 70 in the side wall thereof as shown in Fig. 3. To seal this aperture and form an airtight chamber within the part there is provided a circular transparent wall member 72 of glass or the like which has an axial dimension approximately equal to that of the part 24. The lower edge of the glass wall 72 is seated upon an annular sealing member 74. Similarly there is provided an annular sealing member 76 engaging the upper edge of the glass wall. The transparent wall 72 forms a sight glass rendering the interior of the part 24 visible from the outside and will show any accumulation of moisture in the part 24. It is to be noted that the sight glass 72 is endwise receivable and removable through the opened end of the part 24.

Preferably, as shown in the illustrated embodiment of the invention, the cross sectional dimensions of the upper part 22 and the sight glass 72 are substantially the same so that the edge of one is in alignment with the edge of the other. In properly assembling the parts the flange 56 of the cartridge is interposed between the sealing member 76 of the sight glass and the lower edge of the part 22. To further form a more air-tight connection at this point there is provided an annular sealing member of rubber or the like indicated at 78 between the side wall of the shell 54 of the cartridge and the inner surface of the part 22. This sealing member predisposes the cartridge centrally within the part 22. Below the sealing member 78 is a second sealing member 80 of less thickness but having a greater radial dimension such that it projects beyond the lower edge of the part 22 for engagement therewith. The two sealing members 78 and 80 are usually assembled on the cartridge forming a part thereof and are installed and removed with the cartridge when periodical replacements of the cartridge are made.

The two parts 22 and 24 of the casing are tightly clamped together by means of a single connecting member. This member is in the form of a collar 82 having an internally threaded section 84 for engagement with the external threads formed on the lower part 24 of the casing. The collar is provided with an inwardly projecting flange 86 which is arranged to overlap and engage an outwardly projecting circular lip 88 on the bottom end of the part 22. It is evident that upon tightly threading the collar in place it will draw the two parts of the casing toward one another and compressively secure the same and the flange 56 of the cartridge into tight engagement with the sealing members of the joint. When thus secured the two parts of the casing protectingly house the sight glass and the cartridge. When it is desired to remove either one of these elements for cleaning or replacement it is a simple matter to unthread the collar 82 and separate the parts of the casing one from another in the manner illustrated in the exploded view of Fig. 3.

A drain cock is provided for draining off any moisture accumulated in the compartment formed by the part 24 of the casing. This is accomplished by providing an axial bore 90 in the boss 34 which opens at its upper end into the part 24 and outwardly at its lower end for the discharge of accumulated moisture therethrough. A valve assembly is provided for controlling the discharge of moisture from the casing. This valve assembly comprises a fixed body 92 threaded to the boss 34 and having an internal passage aligning with the bore 90. Rotatably mounted in the body 92 is a valve member 94 which is threaded thereto for axial advancement and retraction. The internal passage of the body 92 is outwardly flared to form a conical seat 96 for the valve member. Extending longitudinally thereof the valve member 94 is a passage 98 which opens out through the lower end of the valve member and extends upwardly but short of the upper end of the valve member. The upper end of the passage 98 communicates by two laterally extending branching ducts 100 which open out on opposite sides of the valve member. Normally the valve member 94 is threaded to closed position and the engagement thereof with the seat of the body 92 prevents any moisture accumulated in the casing from reaching and discharging through the ducts 100 and passage 98. However, upon retraction of the valve member from its seat communication is opened between the bore 98 and the ducts 100 enabling any accumulated moisture in the casing to flow out of the valve assembly.

When installed in an air pressure line such as 12 in Fig. 1, the air is first delivered to the lower part 24 of the casing and thence travels upwardly through the cartridge 52 and out through the check valve 46. In its passage through the cartridge, a substantial portion of the moisture is removed by the porous bronze disc 58. Thereafter, in its passage through the carbon granules 62 any odor present in the air is completely removed. The glass fibres 64 serve to eliminate any residual moisture content in the air. Any foreign matter in the air is removed by the elements in the cartridge. The check valve 46 prevents any return flow of air which may occur in beer dispensing equipment when the pressure in the beer kegs exceeds that of the pump.

Periodically, it is desirable to look through the transparent opening of the casing to determine if any moisture has accumulated. If any appreciable amount of moisture it present, it may be quickly drained by opening the valve 96. Occasionally, throughout the use of the device it is desirable to replace the cartridge with a new one. This is readily accomplished by completely unthreading the collar 82 and separating the two parts 22 and 24 of the casing sufficiently to gain access to the cartridge. Usually one or both sections of the air line 12 to which the device is connected is flexible so that the parts of the casing may be readily separated one from the other. At the same time this separation is accomplished the sight glass 72 is available for removal and cleaning. Usually after a period of use the sight glass becomes fogged with moisture. After cleaning and replacement of the parts the two sections of the casing are quickly secured together in operating condition by merely rethreading the collar 82 in place.

As a result of this invention there is provided in an air pressure line a readily installable and maintainable unit which provides at the discharge end of the line clean, pure and odorless air for any desired purpose. In beer dispensing equipment this is highly desirable in order to prevent contamination of the beer with oily fumes from the compressor or old beer which has flowed into the tank of the compressor at one or more times when the line was opened and the pressure in the kegs exceeded that of the tank. In air lines used in medical and dental practices, the device of the present invention provides pure sanitary air regardless of the fouled condition of the source of the air. For paint spraying apparatus and the like the unit provides dry filtered air in place of carbon dioxide or other fluid heretofore customarily used because of its lack of moisture content.

What I claim is:

1. An air cleaning and deodorizing unit for installation in an air line comprising, in combination, a casing composed of two cylindrical parts each opened at one of its ends and closed to the outside at its opposite end, means for detachably connecting the opened ends of said parts together to seal the interior of the casing from the outside, one of said parts having an aperture through the side thereof, a removable circular transparent wall member endwise receivable through the opened end of said apertured part and sealing the aperture while rendering the interior of the part visible from the outside, a replaceable air filtering and deodorizing cartridge endwise receivable through the opened end of the other of said parts, resilient sealing means disposed between the transparent wall member and the cartridge and compressed therebetween by the connection between the open ends of said parts of the casing said transparent wall member and said cartridge both becoming accessible upon disconnection and separation of the two parts of the casing one from the other.

2. An air cleaning and deodorizing unit for insertion in an air delivery line comprising, in combination, a pair of cylindrically shaped metal shell members each opened at one end and closed by an end wall at the other end and arranged in axial alignment with their open ends facing one another, a replaceable air filtering and deodorizing cartridge in one of said shell members having an outwardly extending flange overlapping the edge of the open end of the shell member, the other of said shell members having an aperture in the side wall thereof and provided interiorly with a removable sleeve-shaped transparent wall sealingly abutting the closed end thereof, means in the end wall of the apertured shell member for connecting the same to the air supply side of an air line, means in the end wall of the other shell member for connecting the same to the discharge side of the air line, sealing means disposed between the flange of the cartridge and the adjacent end of the transparent wall, and a collar threaded to the exterior of one of said shell members and engaging the other shell member to draw the two members together to form an air-tight seal between the flange of the cartridge and the transparent wall, said cartridge and said sleeve-shaped transparent member both being accessible for removal when the collar is unthreaded and the two shell members are separated one from the other.

3. In an air cleaning and deodorizing unit having a casing composed of two cup-shaped members having their opened ends brought opposite one another in substantially abutting relationship, a removable air filtering and deodorizing cartridge in one of said cup-shaped members having an outwardly extending flange oversize the member and overlapping upon the edge of the opened end thereof, sealing means on opposite sides of the flange engaging the same and the edges of the open ends of the cup-shaped members, and a collar encircling the cup-shaped members and threaded to the exterior of one member and engaging the other member and acting to draw the two members together to compress the sealing means between the opened ends of the members and the flange of the cartridge to form an air-tight joint therebetween.

4. An air cleaning and deodorizing unit for installation in an air delivery line comprising, in combination, a casing composed of two cylindrical parts each opened at one end and closed to the outside at the other end, means disconnectibly clamping the open ends of said parts together into a unit, means for connecting one of the parts of the casing into the air supply side of an air line for receiving air under pressure therefrom, means for connecting the other part of the casing into the air discharge side of the air line for exhausting therefrom the air thus introduced into the casing, the part of the casing connected to the supply side of the air line having an aperture in the side wall thereof, a transparent circular wall in the last mentioned part of the casing endwise receivable through the opened end thereof and exposing the interior to view through the aperture, a replaceable air filtering deodorizing cartridge in the other part of the casing and endwise receivable through the opened end thereof, said cartridge and said transparent wall being both accessible for removal when the two parts of the casing are disconnected and separated from one another, and sealing means interposed between the cartridge and the transparent wall and compressed therebetween to form an air-tight joint by the clamping connection of the two parts of the casing.

5. An air cleaning and de-odorizing unit for installation in an air line comprising, in combination, a casing composed of two cylindrically shaped metal shell members each opened at one end and closed by an end wall at the other end, said shell members arranged in axial alignment with one another and having the edges of the open ends facing one another in slightly spaced apart relation, means associated with the end wall of one shell member for connecting the same to the discharge side of an air line, means associated with the end wall of the other shell member for connecting the same to the air supply side of an air line whereby air may be caused to flow through the two shell members of the casing and enter the discharge side of the air line, one of said shell members having a side opening aperture, a removable sleeve-shaped transparent wall in said last mentioned shell member sealingly abutting the end wall thereof and sealingly extending across the side opening aperture thereof, a replaceable air filtering and deodorizing cartridge in the other shell member having an outwardly extending circular flange overlapping the edge of the opened end of the shell member within which it is received, resilient sealing means disposed between said flange and the edge of the opened end of the shell member within which the cartridge is received and disposed between said flange and the adjacent end of the transparent wall, and a collar threaded on the exterior of one of the shell members and engaging the other shell member and acting to draw the shell members together to compress said sealing means to form an air-tight joint, said cartridge and said transparent wall being accessible for removal and replacement only when the collar is unthreaded and the shell members are separated one from the other.

JAY LEE THORPE.

REFERENCES CITED

The following references are of record in the file of this patent:

UNITED STATES PATENTS

| Number | Name | Date |
|---|---|---|
| 1,810,613 | Keller | June 16, 1931 |
| 1,958,735 | Worthington | May 15, 1934 |
| 2,195,565 | Fricke | Apr. 2, 1940 |
| 2,400,719 | Stackhouse | May 21, 1946 |